United States Patent [19]

Stammer

[11] Patent Number: 5,796,901
[45] Date of Patent: Aug. 18, 1998

[54] INDOOR/OUTDOOR TRANSITION CABLE

[75] Inventor: Marc Stammer, Hickory, N.C.

[73] Assignee: Siecor Corporation, Hickory, N.C.

[21] Appl. No.: 100,332

[22] Filed: Jul. 30, 1993

Related U.S. Application Data

[63] Continuation of Ser. No. 921,673, Jul. 30, 1992, abandoned.

[51] Int. Cl.$^6$ .................................................... G02B 6/44
[52] U.S. Cl. ............................................................ 385/100
[58] Field of Search .................................. 385/100, 102, 385/105, 106, 109, 110, 900

[56] References Cited

U.S. PATENT DOCUMENTS

| | | | |
|---|---|---|---|
| 4,304,462 | 12/1981 | Baba et al. | 385/107 |
| 4,381,140 | 4/1983 | Van der Hoek et al. | 385/104 |
| 4,401,366 | 8/1983 | Hope | 385/110 |
| 4,684,213 | 8/1987 | Ishihara | 350/96.23 |
| 4,723,831 | 2/1988 | Johnson et al. | 385/111 |
| 4,752,113 | 6/1988 | Saito et al. | 385/100 |
| 4,752,211 | 6/1988 | Saito et al. | 385/100 |
| 4,784,461 | 11/1988 | Abe et al. | 385/110 X |
| 4,802,732 | 2/1989 | Fukuma et al. | 385/105 |
| 4,828,352 | 5/1989 | Kraft | 350/96.23 |
| 4,852,965 | 8/1989 | Mullin et al. | 385/101 |
| 5,039,197 | 8/1991 | Rawlyk | 385/102 |
| 5,071,221 | 12/1991 | Fujitani et al. | 385/100 |
| 5,189,721 | 2/1993 | Sayegh et al. | 385/114 |
| 5,217,808 | 6/1993 | Cobb | 385/100 X |

*Primary Examiner*—Akm E. Ullah

[57] ABSTRACT

Disclosed is a light waveguide cable which is designed such that one end is to be installed within a building and the other end is to be installed outside the building. The outdoor portion of the cable contains waterblocking materials, while the inside building portion does not. The cable has a flame retardant outer jacket throughout.

6 Claims, 3 Drawing Sheets

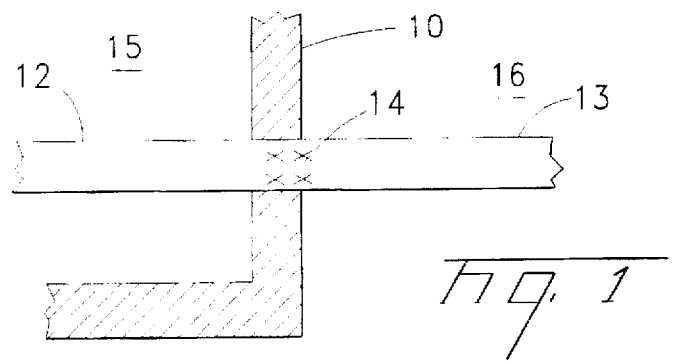
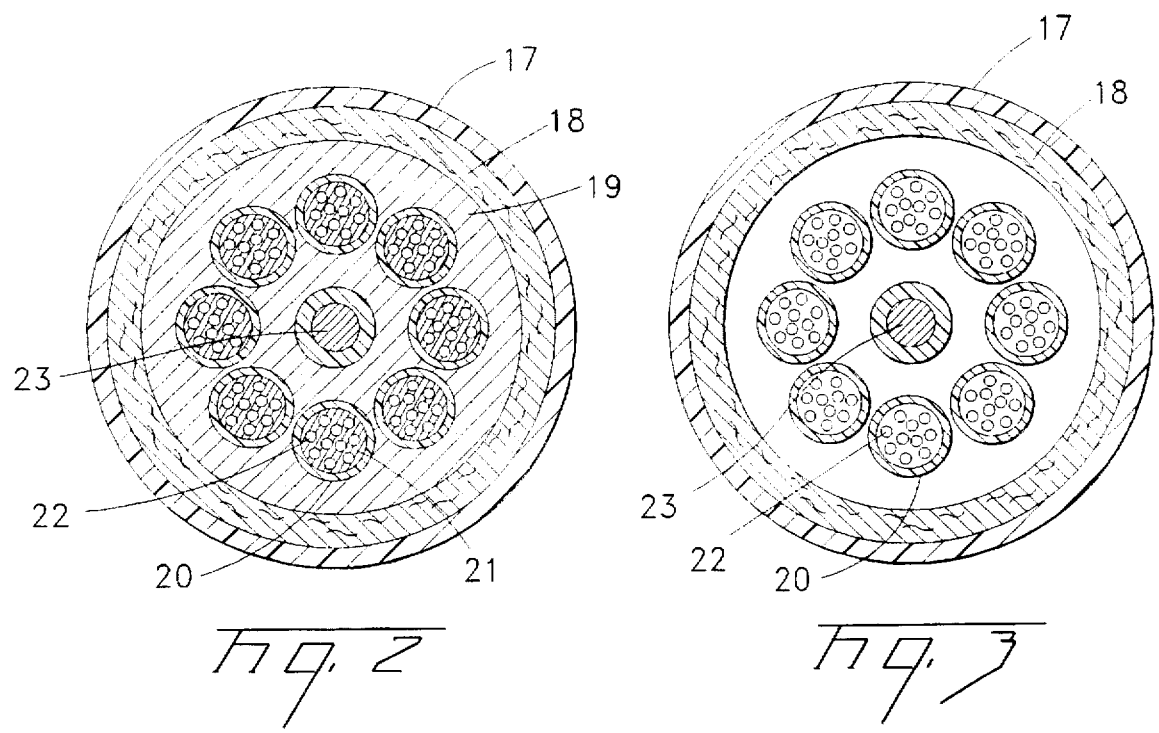
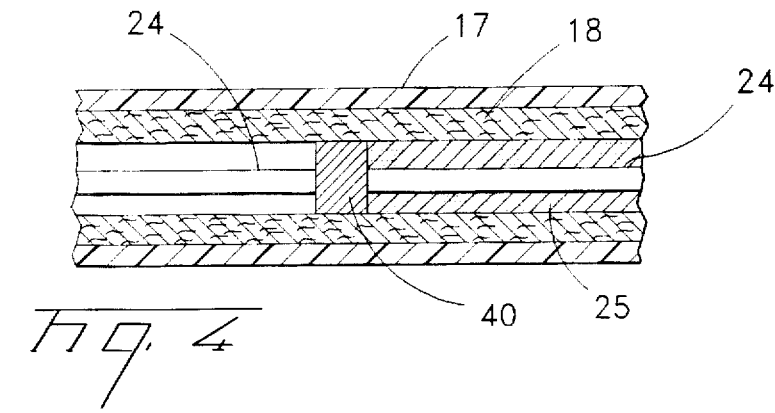

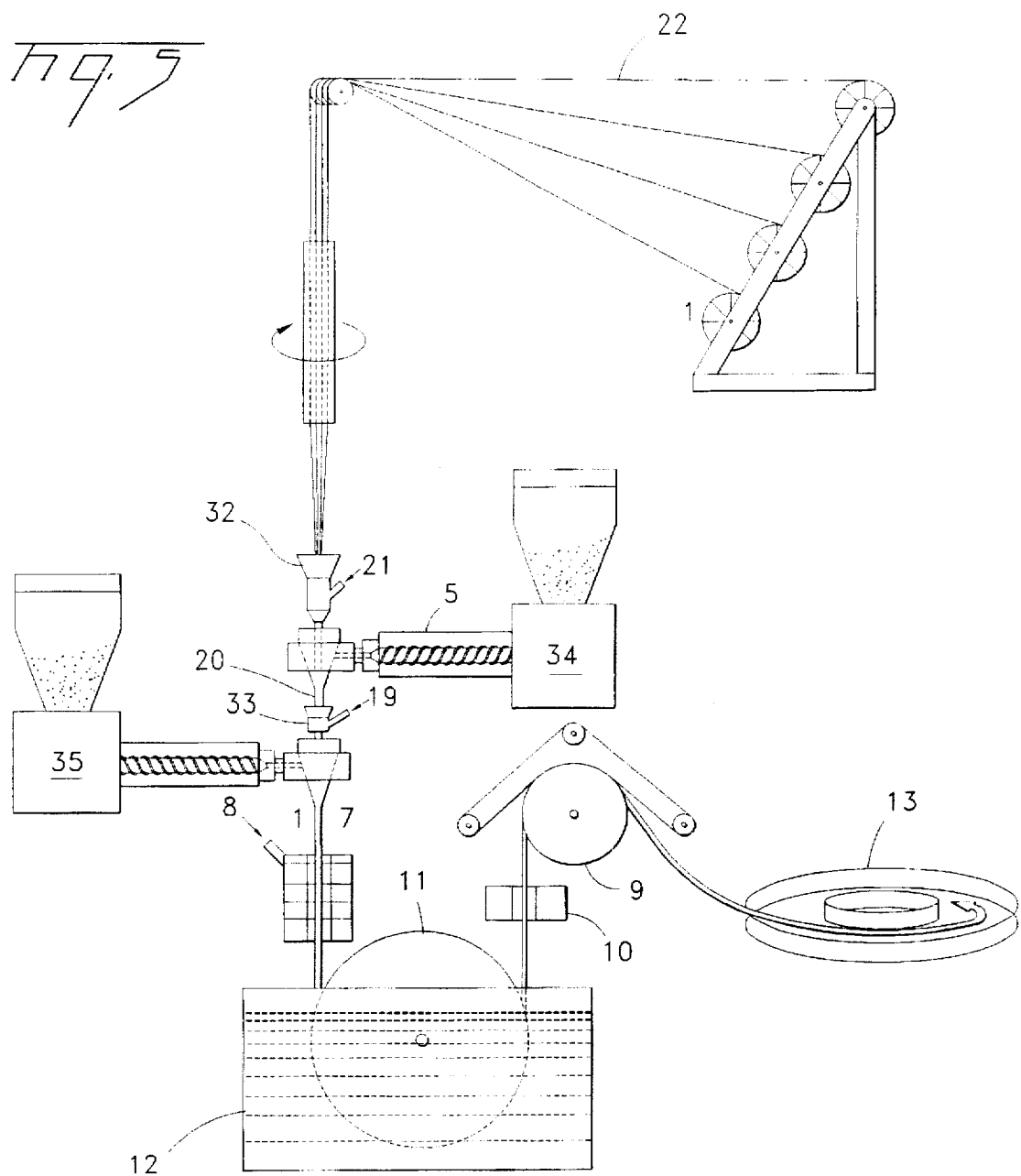

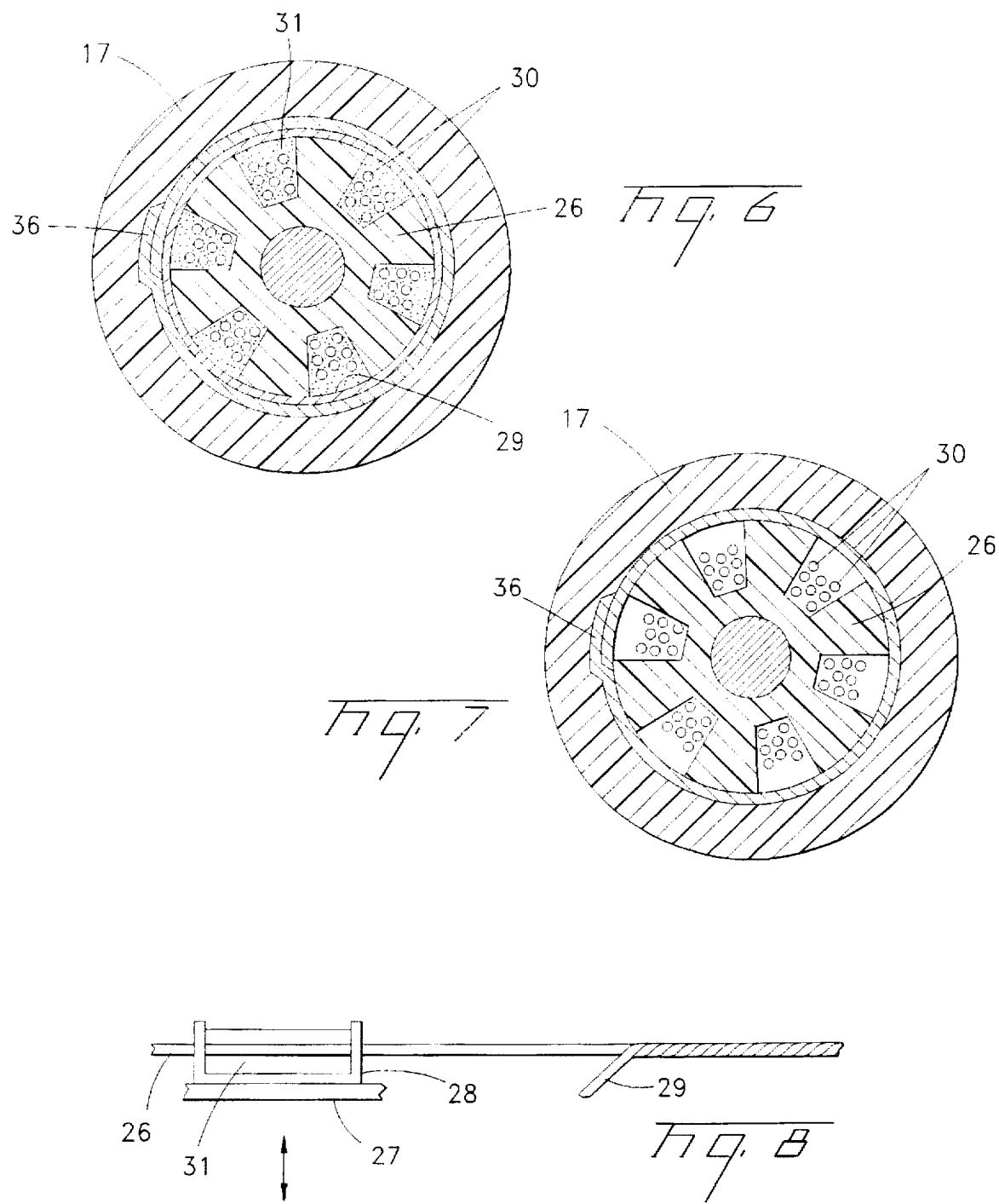

INDOOR/OUTDOOR TRANSITION CABLE

This is a continuation of application Ser. No. 07/921,673 filed on Jul. 30, 1992.

BACKGROUND OF THE INVENTION

The field of the invention is light waveguide cables.

Light waveguide cables installed in buildings must meet applicable code requirements for flame resistance and smoke density, while such cables installed outdoors do not. Building codes usually are derived from the National Electrical Code (NEC).

Cables installed outdoors must generally include means to block the flow of water along the cable in order to minimize damage caused by microbends induced by freezing and thawing of water. Indoor cables are usually protected from the elements and do not require water blocking materials. Typical water blocking materials include filling compounds, which are gels injected within light waveguide carrying buffer tubes; flooding compounds, which are gels placed in voids between the cable jacket and the buffer tubes; and water swellable tapes and water swellable powders, also normally found between the cable jacket and the buffer tubes.

Waterblocking materials generally are not flame resistant and cables containing waterblocking materials generally are not suitable for installation in buildings since they do not meet the NEC requirements.

The NEC has made several exceptions to allow outdoor cables to enter buildings. An outdoor cable may enter a building if the cable is placed in an approved raceway, an enclosed channel. It may also enter if it extends no more than fifty (50) feet within the building and is terminated in an approved closure. This exception allows a limited risk to accommodate the need to allow outdoor cables to enter buildings.

SUMMARY OF THE INVENTION

The improved cable according to the invention has a flame retardant outer jacket. A first lengthwise portion of the cable holds material to block the flow of water in the cable, but a second lengthwise portion of the cable does not hold such material. An interior plug may be placed between the first cable portion and the second cable portion to keep waterblocking material from flowing from the first cable portion to the second cable portion, and the cable outer jacket may be marked to demarcate the boundary between the first cable portion and the second cable portion. Waterblocking materials in the first cable portion may include filling and flooding compounds and water swellable powders and tapes.

The improved cable offers the advantage of being able to enter a building without the use of a raceway and without the need to allow the presence of flame propagating materials even a short distance into the building interior.

BRIEF DESCRIPTION OF THE DRAWINGS

The improved cable according to the invention is described with reference to the several drawings in which:

FIG. 1 is a side elevation view of the cable entering a building;

FIG. 2 is a cross sectional view of the first portion of the cable of FIG. 1;

FIG. 3 is a cross sectional view of the second portion of the cable of FIG. 1;

FIG. 4 is a longitudinal sectional view of a cable having a demarcation plug;

FIG. 5 is a schematic view of a production line for making the cable of FIG. 1;

FIGS. 6 AND 7 are cross sectional views of the first and second portions respectively of the second preferred embodiment of the improved cable; and, FIG. 8 is a schematic view of a production line for making the cable of FIGS. 6 and 7.

DETAILED DESCRIPTION OF THE PREFERRED EMBODIMENTS

A cable according to the invention is shown in FIG. 1 entering a building 10, with the building interior shown as 15 and the outdoor area shown as 16. The cable has a first portion 13 having waterblocking materials and a second portion 12 having no waterblocking materials. Markings 14 are placed on the cable to demarcate the boundary between first portion 13 and second portion 12. First portion 13, as shown in FIG. 2, has a flame resistant jacket 17 made of a flame retardant polyethylene, an aramid yarn layer 18, and an array of buffer tubes 20 holding light waveguides 22. Buffer tubes 20 are arrayed around central member 23. The first portion of the cable also contains flooding compound 19 and filling compound 21.

The second portion of the cable is shown in FIG. 3. The second portion is the same as the first portion as shown in FIG. 2, except that no flooding compound 19 or filling compound 21 is present.

If desired, the improved cable may contain an internal plug 40 as shown in FIG. 4 separating the first portion of the cable containing filling compound 25 from the second portion of the cable which contains no filling compound. Both portions of the cable have a flame retardant jacket 17, aramid fiber 18 and light waveguides 24.

A schematic view of the production line for the cable of FIG. 1 is shown in FIG. 5. Light waveguides 22 are unwound from reels and are coated with filling compound 21 from pump 32 prior to the extrusion of buffer tube 20 by extruder 34. Buffer tube 20, along with any additional buffer tubes desired, are then coated with flooding compound 19 by pump 33 prior to the extrusion of the outer jacket 17 by extruder 35. The cable then proceeds through a water trough 8, cooling basin 12, sheave 11, diameter monitor 10, capstan 9, and is ultimately wound up on a take up tray 13. At the desired demarcation point between the first portion of the cable and the second portion of the cable, pumps 32 and 33 are simply turned off by turning their switches to the "off" position or otherwise removing their source of electric power. The outer jacket would then be marked to show the point at which no further filling or flooding compound was injected into the cable.

If a plug is desired as shown in FIG. 4, prior to jacketing, a tape or resin plug would be applied by hand over the cable core at the predetermined transition point. The core would otherwise be processed normally.

The second embodiment of the improved cable is shown in FIGS. 6 and 7. The first portion of the cable shown in FIG. 6 comprises a slotted core 26, each core slot containing light waveguides 30 and water swellable powder 31. A water swellable tape 29 is wrapped around the slotted core, along with metallic shield 36 or other desired cable components. An outer jacket 17 is extruded over metallic shield 36. The second portion of the cable as shown in FIG. 7 is the same as FIG. 6, except that it contains no water swellable powder 31 or water swellable tape 29.

A schematic view of a processing line for the cable of the second embodiment is shown in FIG. 8. Cable core 26 enters box 28 holding water swellable powder 31 therein. Platform 27 may be stationary, but preferably is vibratory to insure a greater penetration of the powder into the core slots. After powder 31 is added to the slots, water swellable tape 29 is wrapped around the core. When the desired demarcation point between the first portion of the cable and the second portion of the cable is reached, platform 27 is dropped, so that no further powder 31 enters the slots and tape 29 is cut.

Flame retardant polyethylenes can be obtained from Du Pont, Union Carbide Corporation, Lindsey-Williams, Nippon Petrochemicals Co., DAI-Nippon Ink and Chemicals, Inc., and BP Performance Polymers, Inc. Non-halogenated materials may be preferable for some applications.

It will be appreciated by those skilled in the art that many other variations of cables could be made within the scope of the claims. The examples presented are intended to be illustrative rather than exhaustive.

What is claimed is:

1. A light waveguide cable, comprising a flame retardant outer jacket holding at least one light waveguide and also holding an interior plug between a first lengthwise portion of the cable located outside of a building holding waterblocking material and a second lengthwise portion of the cable located in a building holding no waterblocking material.

2. A light waveguide cable comprising a flame retardant outer jacket holding at least one light waveguide, a first lengthwise portion of the cable located outside of a building holding waterblocking material and an adjacent second lengthwise portion of the cable located in a building holding no waterblocking material, the outer jacket being marked at the point between the adjacent first and second cable portions.

3. A light waveguide cable as recited in claim 2, wherein the waterblocking material comprises a filling compound.

4. A light waveguide cable as recited in claim 2, wherein the waterblocking material comprises a flooding compound.

5. A light waveguide cable as recited in claim 2, wherein the waterblocking material comprises water swellable tape.

6. A light waveguide cable as recited in claim 2, wherein the waterblocking material comprises water swellable powder.

* * * * *